(12) United States Patent
Ku (10) Patent No.: US 12,475,936 B2
(45) Date of Patent: Nov. 18, 2025

(54) SENSE AMPLIFIER APPLIED TO NON-VOLATILE MEMORY

(71) Applicant: eMemory Technology Inc., Hsin-Chu (TW)

(72) Inventor: Wei-Ming Ku, Hsinchu County (TW)

(73) Assignee: EMEMORY TECHNOLOGY INC., Hsin-Chu (TW)

( * ) Notice: Subject to any disclaimer, the term of this patent is extended or adjusted under 35 U.S.C. 154(b) by 129 days.

(21) Appl. No.: 18/629,972

(22) Filed: Apr. 9, 2024

(65) Prior Publication Data

US 2024/0420745 A1 Dec. 19, 2024

Related U.S. Application Data

(60) Provisional application No. 63/472,616, filed on Jun. 13, 2023.

(51) Int. Cl.
  *G11C 7/10* (2006.01)
  *G11C 7/08* (2006.01)
  *G11C 7/20* (2006.01)

(52) U.S. Cl.
  CPC ............ *G11C 7/1069* (2013.01); *G11C 7/08* (2013.01); *G11C 7/20* (2013.01)

(58) Field of Classification Search
  CPC ............ G11C 7/1069; G11C 7/08; G11C 7/20
  USPC ................................................... 365/189.011
  See application file for complete search history.

(56) References Cited

U.S. PATENT DOCUMENTS

| | | | |
|---|---|---|---|
| 7,498,850 B2 | 3/2009 | Hendrickson | |
| 8,072,244 B1 | 12/2011 | Liu et al. | |
| 9,076,540 B2 | 7/2015 | Mueller et al. | |
| 9,418,714 B2 | 8/2016 | Sinangil et al. | |
| 10,305,461 B2 | 5/2019 | Kushnarenko et al. | |
| 11,295,788 B2 | 4/2022 | Ku | |
| 2017/0178745 A1* | 6/2017 | Chen | G11C 17/18 |

OTHER PUBLICATIONS

Moosung Kim et al., "A 1Tb 3b/Cell 8th-Generation 3D-NAND Flash Memory with 164MB/s Write Throughput and a 2.4Gb/s Interface", 2022 IEEE International Solid-State Circuits Conference.

* cited by examiner

*Primary Examiner* — Huan Hoang
(74) *Attorney, Agent, or Firm* — WPAT, PC

(57) ABSTRACT

A sense amplifier for a non-volatile memory is provided. A first memory cell of the non-volatile memory is coupled to a data line. The sense amplifier includes a first switching device, a first voltage boosting circuit and a comparator. A first terminal of the first switching device is connected with the data line. A second terminal of the first switching device is connected with a ground terminal. A control terminal of the first switching device receives a reset signal. An input terminal of the first voltage boosting circuit is connected with the data line. An output terminal of the first voltage boosting circuit is connected with a sensing node. A first input terminal of the comparator receives a comparison voltage. A second input terminal of the comparator is connected with the sensing node. An output terminal of the comparator generates an output data.

15 Claims, 9 Drawing Sheets

SENSE AMPLIFIER APPLIED TO NON-VOLATILE MEMORY

This application claims the benefit of U.S. provisional application Ser. No. 63/472,616, filed Jun. 13, 2023, the subject matters of which are incorporated herein by references.

FIELD OF THE INVENTION

The present invention relates to a sense amplifier, and more particularly to a sense amplifier for a non-volatile memory.

BACKGROUND OF THE INVENTION

Generally, a memory cell array of a non-volatile memory comprises plural memory cells. Each memory cell at least comprises a selecting device and a storage device. For example, the storage device is a floating gate transistor, an antifuse type transistor or a resistive element. The operation of the storage device will be described as follows.

The floating gate of the floating gate transistor stores hot carriers (i.e., electrons). According to the number of the stored hot carriers, the storage state of the memory cell is determined. For example, during the program cycle of the non-volatile memory, the number of the hot carriers injected into the floating gate is controlled. Consequently, the threshold voltage of the floating gate transistor is adjusted. Consequently, the storage state of the memory cell is changed. During the read action, a read voltage is provided to the floating gate transistor. Consequently, a cell current (also referred as a read current) is generated. According to the magnitude of the cell current, the storage state of the memory cell is determined as a first storage state or a second storage state. For example, the floating gate transistor is a p-type floating gate transistor. If no hot carriers are stored in the floating gate during the read action, the cell current generated by the memory cell is very low (e.g., nearly zero). Under this circumstance, the storage state of the memory cell is determined as the first storage state. Whereas, if hot carriers are stored in the floating gate, the current cell generated by the memory cell is larger. Under this circumstance, the storage state of the memory cell is determined as the second storage state.

The antifuse type transistor comprises a gate dielectric layer. According to the result of judging whether the gate dielectric layer is ruptured, the storage state of the memory cell can be determined. When a program action of the non-volatile memory is performed, a program voltage is provided to the antifuse type transistor. Consequently, the gate dielectric layer of the antifuse type transistor is ruptured. Under this circumstance, the storage state of the memory cell is changed. When the read action is performed, a read voltage is provided to the antifuse type transistor. Consequently, a cell current (also referred as the read current) is generated. According to the magnitude of the cell current, the storage state of the memory cell is determined as a first storage state or a second storage state. For example, if the gate dielectric layer of the antifuse type transistor is not ruptured during the read action, the cell current generated by the memory cell is very low (e.g., nearly zero). Under this circumstance, the storage state of the memory cell is determined as the first storage state. Whereas, if the gate dielectric layer of the antifuse type transistor is ruptured during the read action, the cell current generated by the memory cell is larger. Under this circumstance, the storage state of the memory cell is determined as the second storage state.

Moreover, by providing various bias voltages to the resistive element, the resistance value of the resistive element is switched between a high resistance value and a low resistance value. According to the magnitude of the resistance value, the storage state of the memory cell is determined. For example, during the program cycle of the non-volatile memory, various bias voltages are provided to control the magnitude of the resistance value of the resistive element. During the read action, a read voltage is provided to the resistive element. Consequently, a cell current (also referred as a read current) is generated. According to the magnitude of the cell current, the storage state of the memory cell is determined as a first storage state or a second storage state.

As mentioned above, it is necessary to additionally provide a sense amplifier in the non-volatile memory. The sense amplifier is used to receive the cell current from the memory cell and judge the storage state of the memory cell.

SUMMARY OF THE INVENTION

An embodiment of the present invention provides a sense amplifier for a non-volatile memory. A first memory cell of the non-volatile memory is coupled to a data line. The sense amplifier includes a first switching device, a first voltage boosting circuit and a comparator. A first terminal of the first switching device is connected with the data line. A second terminal of the first switching device is connected with a ground terminal. A control terminal of the first switching device receives a first control signal. The first control signal is a reset signal. An input terminal of the first voltage boosting circuit is connected with the data line. An output terminal of the first voltage boosting circuit is connected with a sensing node. A first input terminal of the comparator receives a comparison voltage. A second input terminal of the comparator is connected with the sensing node. An output terminal of the comparator generates an output data. In a reset phase of a read action, a data line voltage on the data line is reset to a ground voltage, and a sensing voltage at the sensing node is reset to the ground voltage. In a charge phase of the read action after the reset phase, the first memory cell generates a first cell current to charge the data line, and the sensing voltage is adjusted to the data line voltage under control of the first voltage boosting circuit. In a boost phase of the read action after the charge phase, the sensing voltage is adjusted to the data line voltage plus a first voltage increment under control of the first voltage boosting circuit. According to the comparison voltage and the sensing voltage, the comparator generates the output data to determine a storage state of the first memory cell.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1A:
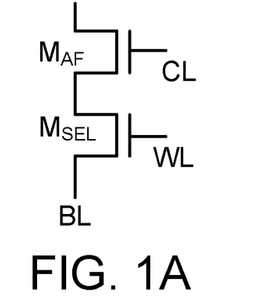
FIG. 1A is a schematic circuit diagram illustrating a memory cell of a non-volatile memory according to an embodiment of the present invention.
Figure 1B:
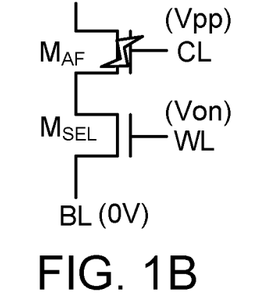
FIGS. 1B, 1C and 1D schematically illustrate the bias voltages provided to the memory cell of FIG. 1A when a program action is performed.
Figure 1C:
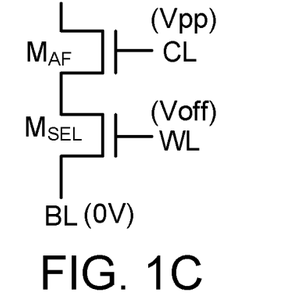
Figures 1D, 1E:
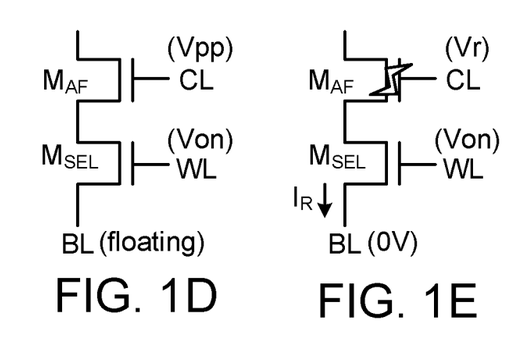
FIGS. 1E and 1F schematically illustrate the bias voltages provided to the memory cell of FIG. 1A when a read action is performed.
Figure 1F:
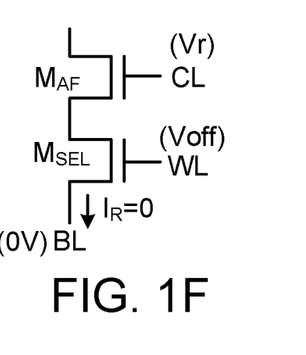

FIG. 1A is a schematic circuit diagram illustrating a memory cell of a non-volatile memory according to an embodiment of the present invention. FIGS. 1B, 1C and 1D schematically illustrate the bias voltages provided to the memory cell of FIG. 1A when a program action is performed. FIGS. 1E and 1F schematically illustrate the bias voltages provided to the memory cell of FIG. 1A when a read action is performed.

The non-volatile memory comprises a selecting device and a storage device. For example, the storage device is an antifuse type transistor $M_{AF}$, and the selecting device is a selecting transistor $M_{SEL}$. The first drain/source terminal of the selecting transistor $M_{SEL}$ is connected with a bit line BL. The gate terminal of the selecting transistor $M_{SEL}$ is connected with a word line WL. The first drain/source terminal of the antifuse type transistor $M_{AF}$ is connected with the second drain/source of the selecting transistor $M_{SEL}$. The gate terminal of the antifuse type transistor $M_{AF}$ is connected with a control line CL. The second drain/source terminal of the antifuse type transistor $M_{AF}$ is in a floating state.

Generally, when the program action is performed, the memory cell is controlled to be in one of two different storage states. Please refer to FIG. 1B. When the program action is performed, the control line CL receives a program voltage Vpp, the bit line BL receives a ground voltage (0V), and the word line WL receives an on voltage Von. Meanwhile, the selecting transistor $M_{SEL}$ is turned on, and the voltage stress withstood by the gate dielectric layer of the antifuse type transistor $M_{AF}$ is equal to the program voltage Vpp. Consequently, the gate dielectric layer of the antifuse type transistor $M_{AF}$ is ruptured. Under this circumstance, the memory cell is in the low-resistance storage state. For example, the program voltage Vpp is 5V, and the on voltage Von is 1.2V.

Please refer to FIG. 1C. When the program action is performed, the control line CL receives the program voltage Vpp, the bit line BL receives the ground voltage (0V), and the word line WL receives an off voltage Voff. Meanwhile, the selecting transistor $M_{SEL}$ is turned off, and the voltage stress withstood by the gate dielectric layer of the antifuse type transistor $M_{AF}$ is zero. Consequently, the gate dielectric layer of the antifuse type transistor $M_{AF}$ is not ruptured. Under this circumstance, the memory cell is in the high-resistance storage state. The example of programming the memory cell to the high-resistance storage state is not restricted. Please refer to FIG. 1D. When the program action is performed, the bit line BL is in the floating state, and the word line WL receives the on voltage Von. Consequently, the memory cell is in the high-resistance storage state. For example, the off voltage Voff is 0V.

When the read action is performed, the storage state of the memory cell can be judged. Please refer to FIGS. 1E and 1F. When the read action is performed, the control line CL receives a read voltage Vr, the bit line BL receives the ground voltage (0V), and the word line WL receives the on voltage Von. As shown in FIG. 1E, the selecting transistor $M_{SEL}$ is turned on. Since the gate dielectric layer of the antifuse type transistor $M_{AF}$ is ruptured, the higher cell current $I_R$ is generated on the bit line BL. As shown in FIG. 1F, the selecting transistor $M_{SEL}$ is turned on. Since the gate dielectric layer of the antifuse type transistor $M_{AF}$ is not ruptured, a very low cell current (e.g., $I_R=0$) is generated on the bit line BL. Consequently, when the read action is performed, one of the two storage states of the memory can be determined according to the magnitude of the cell current on the bit line BL. For example, the read voltage Vr is 2.5V.

It is noted that the storage device is not restricted to the antifuse type transistor. For example, in some other embodiments, the storage device in the memory cell of the non-volatile memory is a floating gate transistor or a resistive element. When the read action is performed, the storage state of the memory cell is determined according to the magnitude of the generated cell current.

Figure 2:
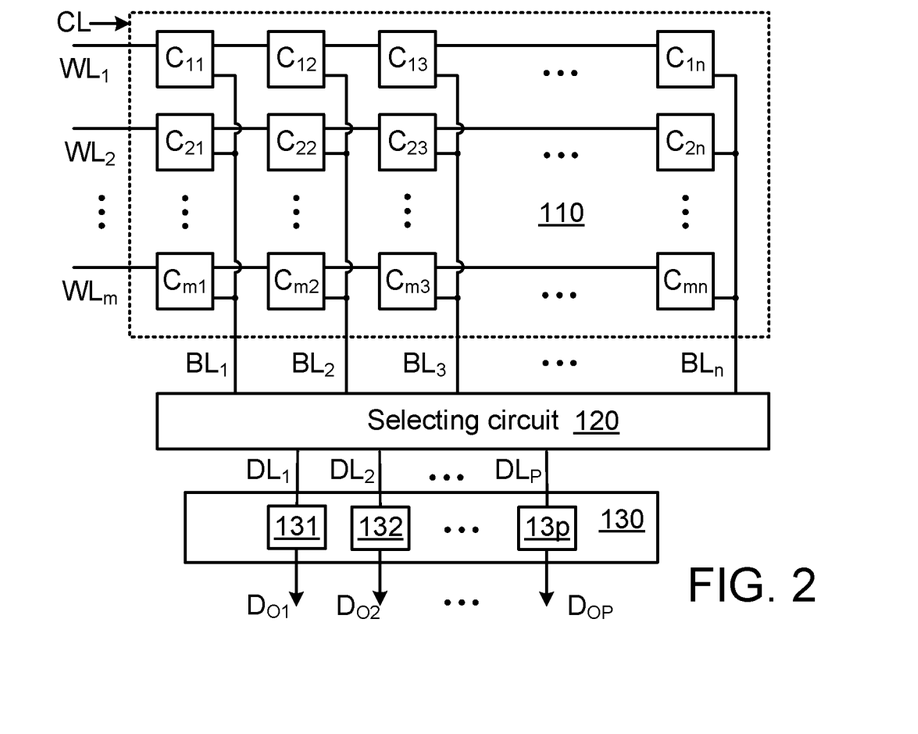
FIG. 2 is a schematic diagram illustrating the architecture of the non-volatile memory.

FIG. 2 is a schematic diagram illustrating the architecture of the non-volatile memory. As shown in FIG. 2, the non-voltage memory comprises a memory cell array 110, a selecting circuit 120 and a sensing circuit 130. The memory cell array 110 comprises m×n memory cells $C_{11}$~$C_{mn}$, wherein m and n are positive integers. The storage devices of the memory cells $C_{11}$~$C_{mn}$ are antifuse type transistors, floating gate transistors or resistive elements.

As shown in FIG. 2, all memory cells $C_{11}$~$C_{mn}$ of the memory cell array 110 are connected with a control line CL. In the memory cell array 110, the n memory cells $C_{11}$~$C_{1n}$ in the first row are connected with a word line $WL_1$. The n memory cells $C_{11}$~$C_{1n}$ in the first row are respectively connected with the n bit lines $BL_1$~$BL_n$. The n memory cells $C_{21}$~$C_{2n}$ in the second row are connected with a word line $WL_2$. The n memory cells $C_{21}$~$C_{2n}$ in the second row are respectively connected with the n bit lines $BL_1$~$BL_n$. The rest may be deduced by analogy. The n memory cells $C_{m1}$~$C_{mn}$ in the m-th row are connected with a word line $WL_m$. The n memory cells $C_{m1}$~$C_{mn}$ in the m-th row are respectively connected with the n bit lines $BL_1$~$BL_n$.

The selecting circuit 120 is connected with the n bit lines $BL_1$~$BL_n$ and p data lines $DL_1$~$DL_p$, wherein p is a positive integer, and p is smaller than or equal to n. When the read action is performed on the non-volatile memory, the selecting circuit 120 determines p bit lines from the n bit lines $BL_1$~$BL_n$, and the p bit lines are correspondingly respectively connected with the p data lines $DL_1$~$DL_p$.

The sensing circuit 130 comprises p sense amplifiers 131~13p. The p sense amplifiers 131~13p are respectively connected with the corresponding p data lines $DL_1$~$DL_p$. The circuitry structures of the p sense amplifiers 131~13p are identical. When the read action is performed, the p sense amplifiers 131~13p of the sensing circuit 130 receive cell currents from the corresponding data lines $DL_1$~$DL_p$, and a p-bit output data $D_{O1}$~$D_{OP}$ is generated to indicate the storage states of p selected memory cells. In other words, the sensing circuit 130 can judge the storage states of the p memory cells in the selected row once.

For example, n is 32, and p is 8. When the read action is performed and the word line $WL_1$ is activated, the first row is the selected row. Moreover, during a first sensing cycle, the bit lines $BL_1$~$BL_8$ are respectively connected with the data lines $DL_1$~$DL_8$ by the selecting circuit 120. Consequently, the eight memory cells $C_{11}$~$C_{18}$ of the selected row are the selected memory cell. Under this circumstance, the cell currents generated by the selected memory cells $C_{11}$~$C_{18}$ flow to the sensing circuit 130. According to the magnitudes of the cell currents on the data lines $DL_1$~$DL_8$, the sensing circuit 130 generates a one-byte output data $D_{O1}$~$D_{O8}$ to indicate the storage states of the selected memory cell $C_{11}$~$C_{18}$.

Similarly, during a second sensing cycle of the read action, the bit lines $BL_9$~$BL_{16}$ are sequentially connected with the data lines $DL_1$~$DL_8$ by the selecting circuit 120, and the sensing circuit 130 sequentially generates the corresponding output data $D_{O1}$~$D_{O8}$. Similarly, during third sensing cycle of the read action, the bit lines $BL_{17}$~$BL_{24}$ are sequentially connected with the data lines $DL_1$~$DL_8$ by the selecting circuit 120, and the sensing circuit 130 sequentially generates the corresponding output data $D_{O1}$~$D_{O8}$. Similarly, during a fourth sensing cycle of the read action, the bit lines $BL_{25}$~$BL_{32}$ are sequentially connected with the data lines $DL_1$~$DL_8$ by the selecting circuit 120, and the sensing circuit 130 sequentially generates the corresponding output data $D_{O1}$~$D_{O8}$. Consequently, according to the four output data $D_{O1}$~$D_{O8}$ generated in the four sensing cycles, the sensing circuit 130 acquires the storage states of the 32 memory cells $C_{11}$~$C_{1n}$ (i.e., n=32) in the first row (i.e., the selected row). Since the circuitry structures of the p sense amplifiers 131~13p are identical, only the sense amplifier 131 and its operation principle will be described as follows.

Figure 3A:
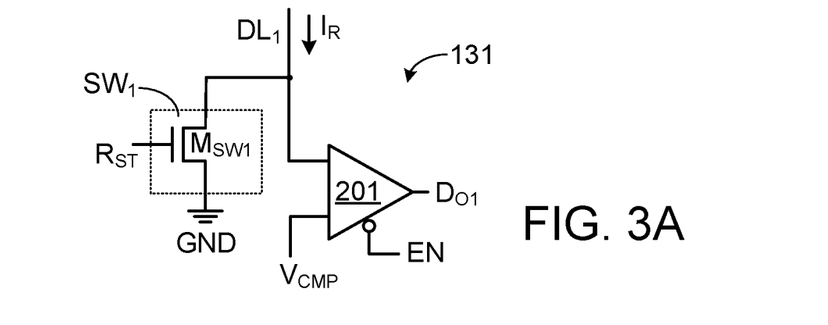
FIG. 3A is a schematic circuit diagram of a sense amplifier according to a first embodiment of the present invention.

FIG. 3A is a schematic circuit diagram of a sense amplifier according to a first embodiment of the present invention.

The sense amplifier 131 comprises a switching device $SW_1$ and a comparator 201. The first terminal of the switching device $SW_1$ is connected with the data line $DL_1$. The second terminal of the switching device $SW_1$ is connected with a ground terminal GND. The control terminal of the switching device $SW_1$ receives a reset signal $R_{ST}$. The first input terminal of the comparator 201 receives a comparison voltage $V_{CMP}$. The second input terminal of the comparator 201 is connected with the data line $DL_1$. The output terminal of the comparator 201 generates the output data $D_{O1}$. In addition, the enable terminal of the comparator 201 receives an enable signal EN.

For example, the switching device is a switching transistor $M_{SW1}$. The first drain/source terminal of the switching transistor $M_{SW1}$ is connected with the data line $DL_1$. The second drain/source terminal of the switching transistor $M_{SW1}$ is connected with the ground terminal GND. The gate terminal of the switching transistor $M_{SW1}$ receives the reset signal $R_{ST}$. Moreover, the comparator 201 is implemented with an operation amplifier.

When the read action is performed, a selected memory cell in the memory cell array 110 is coupled to the sense amplifier 131 through the selecting circuit 120. According to the cell current $I_R$, the storage state of the selected memory cell is determined by the sense amplifier 131. When the read action is performed, the operations of the sense amplifier will be understood by referring to FIGS. 3B to 3E.

Figure 3B:
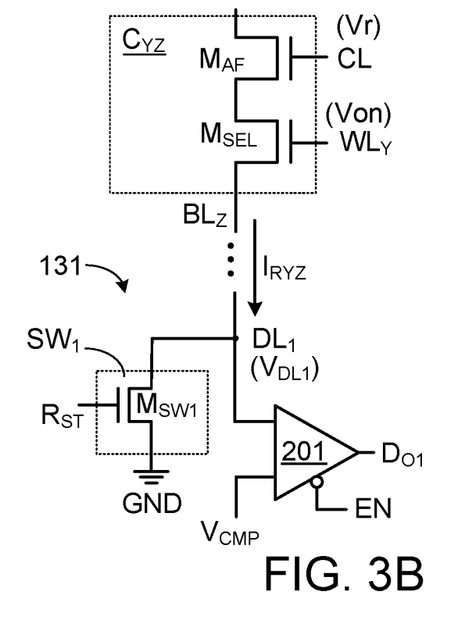
FIGS. 3B and 3D are schematic circuit diagrams illustrating the operations of the sense amplifier when the read action is performed.
Figure 3C:
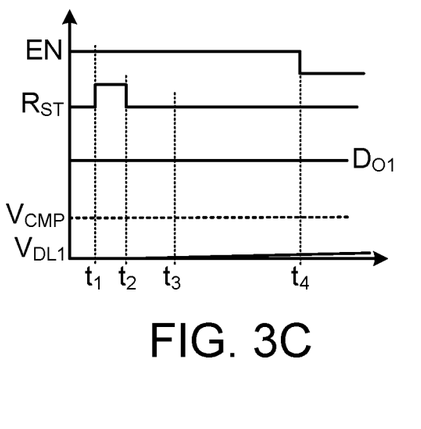
FIGS. 3C and 3E are schematic timing waveform diagrams illustrating associated signals of the sense amplifier when the read action is performed.
Figure 3D:
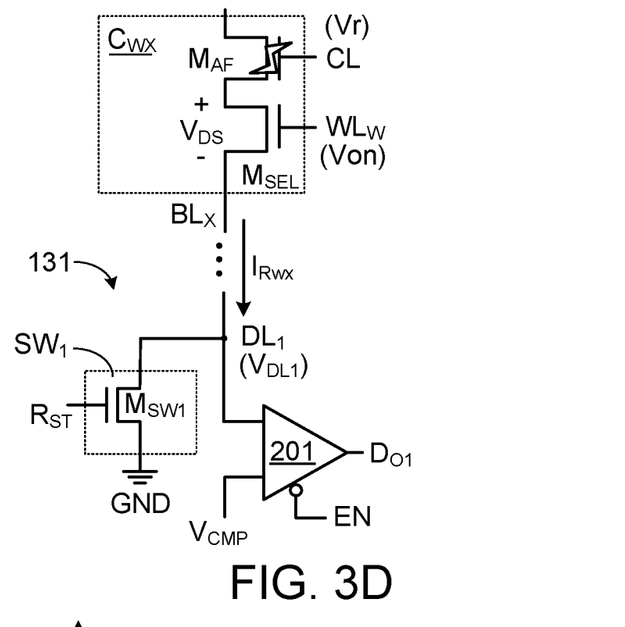
Figure 3E:
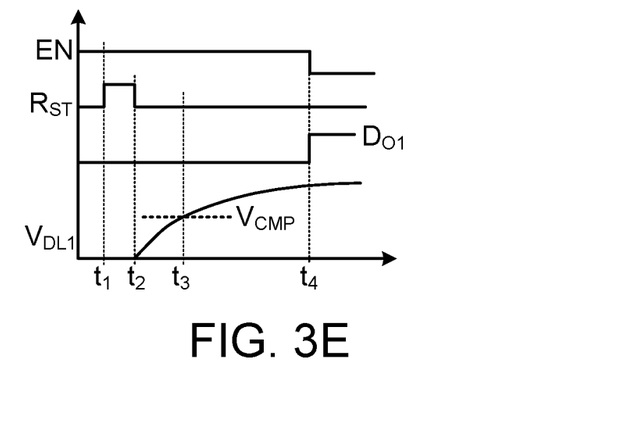

FIGS. 3B and 3D are schematic circuit diagrams illustrating the operations of the sense amplifier when the read action is performed. FIGS. 3C and 3E are schematic timing waveform diagrams illustrating associated signals of the sense amplifier when the read action is performed.

Please refer to FIGS. 3B and 3C. When the read action is performed, the word lien $WL_Y$ and the bit line $BL_Z$ in the memory cell array are activated. The selected memory cell $C_{YZ}$ is coupled to the data line $DL_1$ through the bit line $BL_Z$. In the time interval between the time point $t_1$ and the time point $t_2$, the reset signal $R_{ST}$ is in a high-level state, and the switching transistor $M_{SW1}$ is turned on. Meanwhile, the switching device $SW_1$ is in a close state, and the data line $DL_1$ is pulled down to the ground voltage. That is, the data line voltage $V_{DL1}$ is 0V.

In the time interval between the time point $t_2$ and the time point $t_4$, the reset signal $R_{ST}$ is in the low-level state, and the switching transistor $M_{SW1}$ is turned off. Meanwhile, the switching device $SW_1$ is in an open state. The cell current $I_{RYZ}$ charges the data line $DL_1$. Consequently, the data line voltage $V_{DL1}$ starts to rise from 0V. Since the gate dielectric layer of the antifuse type transistor $M_{AF}$ is not ruptured, the selected memory cell $C_{YZ}$ generates a smaller cell current $I_{RYZ}$ (e.g., nearly zero) to charge the data line $DL_1$. Consequently, the data line voltage $V_{DL1}$ is very low and nearly unchanged. At the time point $t_4$, the enable signal EN is activated, and the comparator 210 is enabled. Since the data line voltage $V_{DL1}$ is lower than the comparison voltage $V_{CMP}$, the comparator 210 generates a low-level output data $D_{O1}$. The low-level output data $D_{O1}$ from the sense amplifier 131 indicates that the selected memory cell $C_{YZ}$ is in a high-resistance storage state (e.g., a first storage state).

Please refer to FIGS. 3D and 3E. When the read action is performed, the word lien $WL_W$ and the bit line $BL_X$ in the memory cell array are activated. The selected memory cell $C_{WX}$ is coupled to the data line $DL_1$ through the bit line $BL_X$. In the time interval between the time point $t_1$ and the time point $t_2$, the reset signal $R_{ST}$ is in a high-level state, and the switching transistor $M_{SW1}$ is turned on. Meanwhile, the switching device $SW_1$ is in a close state, and the data line $DL_1$ is pulled down to the ground voltage. That is, the data line voltage $V_{DL1}$ is 0V.

In the time interval between the time point $t_2$ and the time point $t_4$, the reset signal $R_{ST}$ is in the low-level state, and the switching transistor $M_{SW1}$ is turned off. Meanwhile, the switching device $SW_1$ is in the open state. The cell current $I_{RWX}$ charges the data line $DL_1$. Consequently, the data line voltage $V_{DL1}$ starts to rise from 0V. Since the gate dielectric layer of the antifuse type transistor $M_{AF}$ is ruptured, the selected memory cell $C_{WX}$ generates a larger cell current $I_{RWX}$ to charge the data line $DL_1$. After the time point $t_3$, the data line voltage $V_{DL1}$ exceeds the comparison voltage $V_{CMP}$. At the time point $t_4$, the enable signal EN is activated, and the comparator 210 is enabled. Since the data line voltage $V_{DL1}$ exceeds the comparison voltage $V_{CMP}$, the comparator 210 generates a high-level output data $D_{O1}$. The high-level output data $D_{O1}$ from the sense amplifier 131 indicates that the selected memory cell $C_{WX}$ is in a low-resistance storage state (e.g., a second storage state).

In FIGS. 3B to 3E, the low-level output data $D_{O1}$ from the sense amplifier 131 indicates that the selected memory cell is in the first storage state, and the high-level output data $D_{O1}$ from the sense amplifier 131 indicates that the selected memory cell is in the second storage state. In some other embodiments, the connection relationship between the comparator 201 and associated components is varied. Consequently, the high-level output data $D_{O1}$ from the sense amplifier 131 indicates that the selected memory cell is in the first storage state, and the low-level output data $D_{O1}$ from the sense amplifier 131 indicates that the selected memory cell is in the second storage state.

Figure 3F:
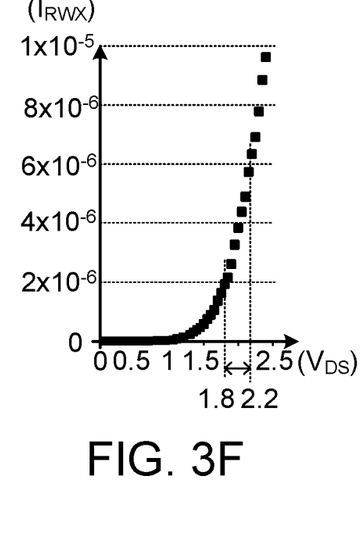
FIG. 3F is a plot illustrating the relationship between the drain-source voltage of the selecting transistor in the memory cell and the cell current.

FIG. 3F is a plot illustrating the relationship between the drain-source voltage of the selecting transistor in the memory cell and the cell current.

Take the selected memory cell $C_{WX}$ as shown in FIG. 3D for example. When the read action is performed, the word line $WL_W$ receives an on voltage Von (e.g., 1.2V). In addition, the read voltage Vr is 2.5V. The cell current $I_{RWX}$ charges the data line $DL_1$. Consequently, the data line voltage $V_{DL1}$ starts to rise from 0V. Since the data line voltage $V_{DL1}$ rises, the drain-source voltage $V_{DS}$ of the selecting transistor $M_{SEL}$ drops. Consequently, the magnitude of the cell current $I_{RWX}$ decreases.

Please refer to FIG. 3F. In case that the drain-source voltage $V_{DS}$ of the selecting transistor $M_{SEL}$ is 2.2V, the cell current $I_{RWX}$ is about 6 μA. In case that the drain-source voltage $V_{DS}$ of the selecting transistor $M_{SEL}$ is 1.8V, the cell current $I_{RWX}$ is about 2 μA. In other words, as the drain-source voltage $V_{DS}$ of the selecting transistor $M_{SEL}$ changes from 2.2V to 1.8V, the magnitude of the cell current $I_{RWX}$ decays by about three times.

When the read action is performed, the cell current $I_{RWX}$ charges the data line $DL_1$. Consequently, the data line voltage $V_{DL1}$ starts to rise. Since the data line voltage $V_{DL1}$ rises, the drain-source voltage $V_{DS}$ of the selecting transistor $M_{SEL}$ drops. Consequently, the magnitude of the cell current $I_{RWX}$ decays quickly, and the sensing time is too long. Alternatively, since the magnitude of the cell current $I_{RWX}$ decays too quickly, the data line voltage $V_{DL1}$ cannot exceed the comparison voltage $V_{CMP}$. Under this circumstance, the sense amplifier 131 is possibly suffered from misjudgment.

Figure 4:
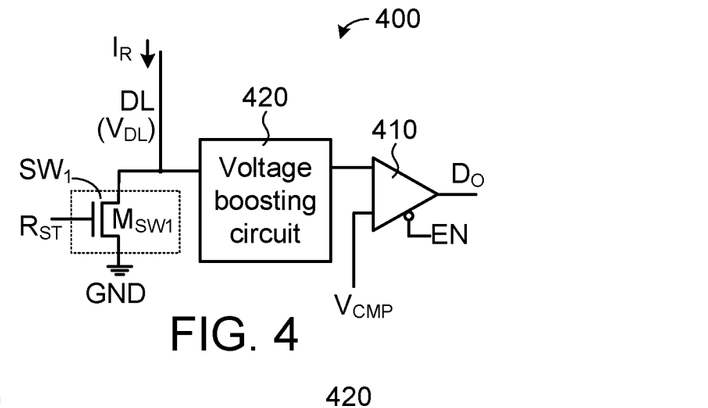
FIG. 4 is a schematic circuit diagram of a sense amplifier according to a second embodiment of the present invention.

FIG. 4 is a schematic circuit diagram of a sense amplifier according to a second embodiment of the present invention. The sense amplifier 400 of the second embodiment is additionally equipped with a voltage boosting circuit 420. The voltage boosting circuit 420 is connected between the data line DL and the comparator 410. When the read action is performed, compared with the read action in the FIG. 3D, the drain-source voltage $V_{DS}$ of the selecting transistor $M_{SEL}$ in the embodiments of the present invention has a larger value, the selected memory cell can generate a larger cell current $I_R$, and the voltage boosting circuit 420 is able to boost the data line voltage $V_{DL}$ quickly according to the larger cell current $I_R$. Consequently, the sense amplifier 400 can correctly judge the storage state of the selected memory cell.

The sense amplifier 400 comprises a switching device $SW_1$, a voltage boosting circuit 420 and a comparator 410. The first terminal of the switching device $SW_1$ is connected with the data line DL. The second terminal of the switching device $SW_1$ is connected with the ground terminal GND. The control terminal of the switching device $SW_1$ receives a reset signal $R_{ST}$.

The input terminal of the voltage boosting circuit 420 is connected with the data line DL. The first input terminal of the comparator 410 receives a comparison voltage $V_{CMP}$. The second input terminal of the comparator 410 is connected with the output terminal of the voltage boosting circuit 420. The enable terminal of the comparator 410 receives an enable signal EN. The output terminal of the comparator 410 generates an output data $D_O$.

The voltage boosting circuit 420 comprises at least one boosting device. The circuitry structure of the boosting device and the operating principles of the sense amplifier 400 will be described as follows.

Figure 5A:
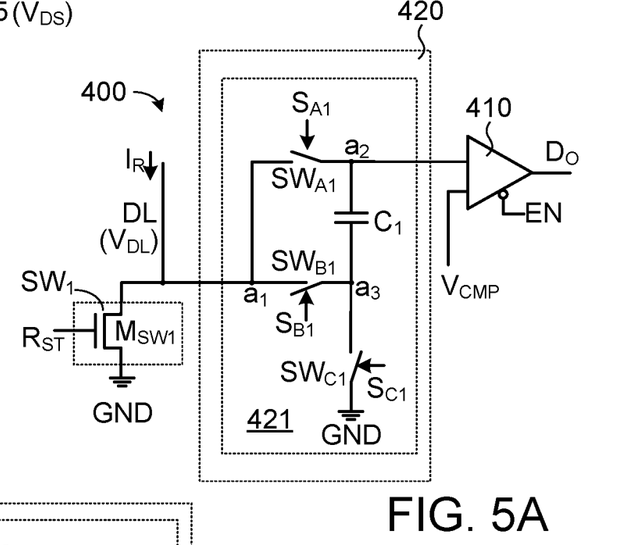
FIG. 5A is a schematic diagram illustrating the detailed circuitry structure of the sense amplifier according to the second embodiment.

FIG. 5A is a schematic diagram illustrating the detailed circuitry structure of the sense amplifier according to the second embodiment. As shown in FIG. 5A, the voltage boosting circuit 420 comprises a single boosting device 421.

The boosting device 421 comprises three switching devices $SW_{A1}$, $SW_{B1}$ and $SW_{C1}$ and a capacitor $C_1$. The node $a_1$ is an input terminal of the boosting device 421. The node $a_2$ is an output terminal of the boosting device 421. The input terminal of the boosting device 421 is connected with the data line DL. The output terminal of the boosting device 421 is connected with the comparator 410. In the boosting device 421, the first terminal of the switching device $SW_{A1}$ is connected with the node $a_1$, the second terminal of the switching device $SW_{A1}$ is connected with the node $a_2$, and the control terminal of the switching device $SW_{A1}$ receives a control signal $S_{A1}$. The first terminal of the switching device $SW_{B1}$ is connected with the node $a_1$. The second terminal of the switching device $SW_{B1}$ is connected with a node $a_3$. The control terminal of the switching device $SW_{B1}$ receives a control signal $S_{B1}$. The first terminal of the switching device $SW_{C1}$ is connected with the node $a_3$. The second terminal of the switching device $SW_{C1}$ is connected with the ground terminal GND. The control terminal of the switching device $SW_{C1}$ receives a control signal $S_{C1}$. The capacitor $C_1$ is connected between the node $a_2$ and the node $a_3$.

The first input terminal of the comparator 410 receives the comparison voltage $V_{CMP}$. The second terminal of the comparator 410 is connected with the node $a_2$. The enable terminal of the comparator 410 receives the enable signal EN. The output terminal of the comparator 410 generates the output data $D_O$. Generally, the node $a_2$ is the output terminal of the boosting device 421. The node $a_2$ is served as a sensing node. That is, the second input terminal of the comparator 410 is connected with the sensing node $a_2$. According to the relationship between a sensing voltage $V_{a2}$ at the sensing node and the comparison voltage $V_{CMP}$, the comparator 410 judges the storage state of the selected memory cell.

Figure 5B:
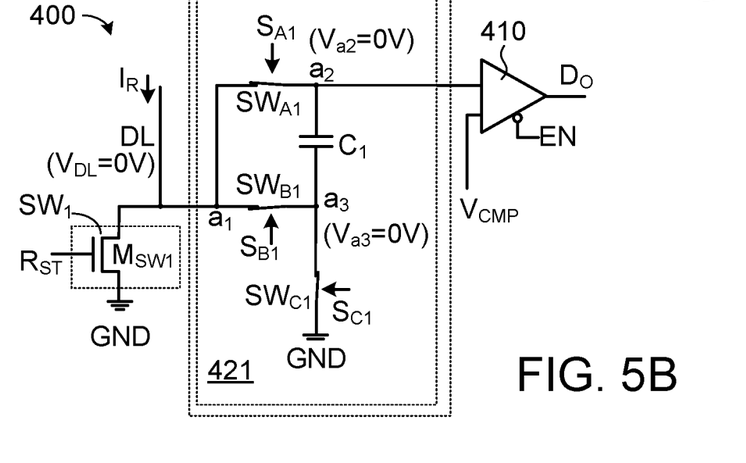
FIGS. 5B, 5C and 5D schematically illustrate the operations of the sense amplifier according to the second embodiment of the present invention.
Figure 5C:
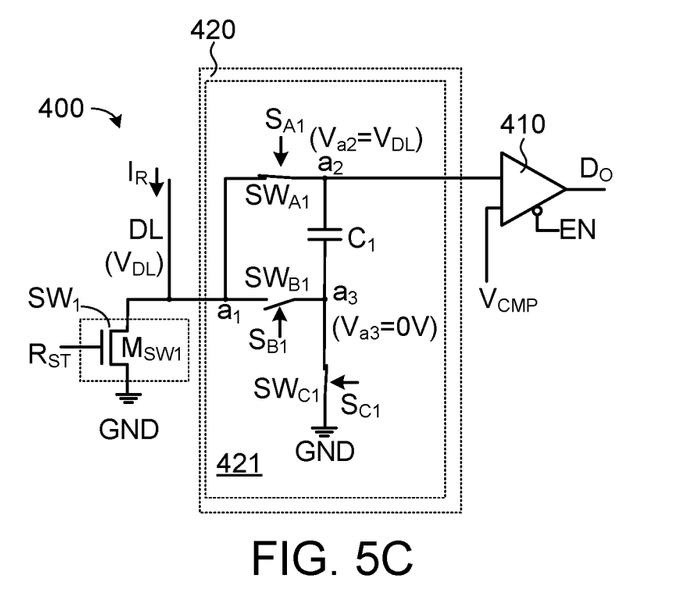
Figure 5D:
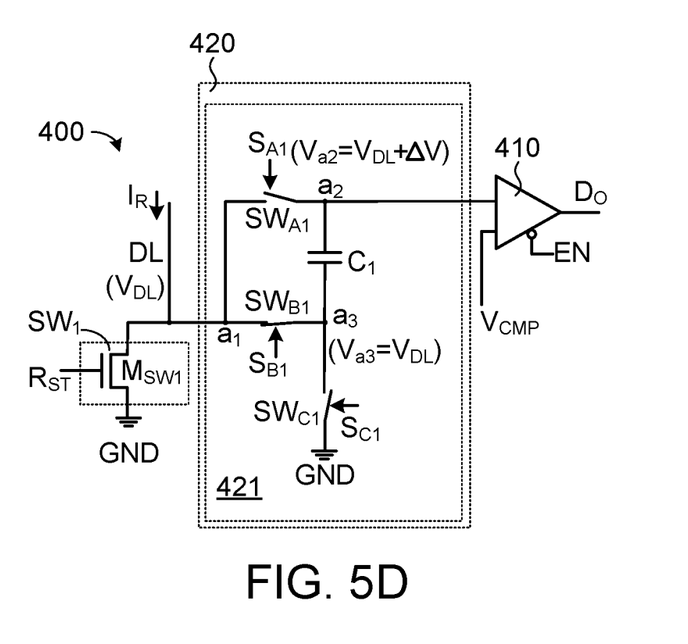
Figure 5E:
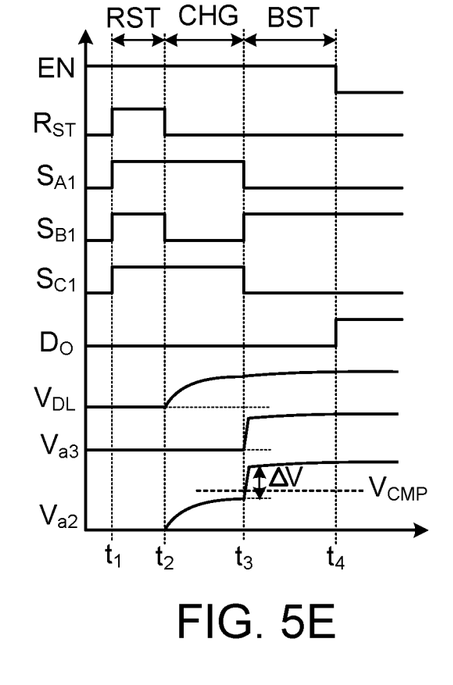
FIG. 5E is a schematic timing waveform diagram illustrating associated signals of the sense amplifier when the selected memory cell in the low-resistance state is sensed.
Figure 5F:
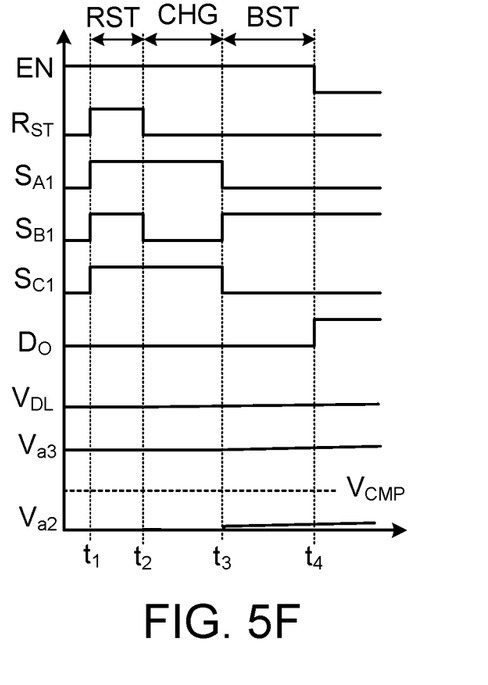
FIG. 5F is a schematic timing waveform diagram illustrating associated signals of the sense amplifier when the selected memory cell in the high-resistance state is sensed.

FIGS. 5B, 5C and 5D schematically illustrate the operations of the sense amplifier according to the second embodiment of the present invention. FIG. 5E is a schematic timing waveform diagram illustrating associated signals of the sense amplifier when the selected memory cell in the low-resistance state (e.g., the second storage state) is sensed. FIG. 5F is a schematic timing waveform diagram illustrating associated signals of the sense amplifier when the selected memory cell in the high-resistance state (e.g., the first storage state) is sensed.

Please refer to FIGS. 5B and 5E. The time interval between the time point $t_1$ and $t_2$ is a reset phase RST of the read action. In the reset phase RST, the reset signal $R_{ST}$ is in the high-level state, the control signals $S_{A1}$, $S_{B1}$ and $S_{C1}$ are in the high-level state, and the switching devices $SW_1$, $SW_{A1}$, $SW_{B1}$ and $SW_{C1}$ are in the close state. Meanwhile, all of the data line voltage $V_{DL}$, the sensing voltage $V_{a2}$ at the sensing node $a_2$ and the voltage $V_{a3}$ at the node $a_3$ are the ground voltage (0V). That is, the sensing voltage $V_{a2}$ at the sensing node $a_2$ is reset to the ground voltage (0V). Generally, the reset signal $R_{ST}$ is activated in the reset phase RST only, and the reset signal $R_{ST}$ is inactivated in the other phases. In other words, the switching device $SW_1$ is in the close state in the reset phase RST only, and the switching device $SW_1$ is in the open state in the other phases.

Please refer to FIGS. 5C and 5E. The time interval between the time point $t_2$ and $t_3$ is a charge phase CHG of the read action. In the charge phase CHG, the control signals $S_{A1}$ and $S_{C1}$ are in the high-level state, the control signals $S_{B1}$ is in the low-level state, the switching devices $SW_{A1}$ and $SW_{C1}$ are in the close state, and the switching devices $SW_{B1}$ is in the open state. Meanwhile, the cell current $I_R$ charges the data line DL. Consequently, the data line voltage $V_{DL}$ starts to rise. Under control of the voltage boosting circuit 420, the data line voltage $V_{DL}$ is equal to the sensing voltage $V_{a2}$ at the sensing node $a_2$. That is, the sensing voltage $V_{a2}$ at the sensing node $a_2$ is charged to the data line voltage $V_{DL}$. Moreover, the voltage $V_{a3}$ at the node $a_3$ is the ground voltage (0V).

Please refer to FIGS. 5D and 5E. The time interval between the time point $t_5$ and $t_4$ is a boost phase BST of the read action. In the boost phase BST, the control signals $S_{A1}$ and $S_{C1}$ are in the low-level state, the control signal $S_{B1}$ is in the high-level state, the switching devices $SW_{A1}$ and $SW_{C1}$ are in the open state, and the switching devices $SW_{B1}$ is in the close state. Meanwhile, under the control of the voltage boosting circuit 420, the node $a_2$ is in the floating state. Consequently, the voltage $V_{a3}$ at the node $a_3$ rises from 0V to the data line voltage $V_{DL}$, and the sensing voltage $V_{a2}$ at the sensing node $a_2$ is boosted to the data line voltage $V_{DL}$ by a voltage increment $\Delta V$ through the capacitor $C_1$. That is, under control of the voltage boosting circuit 420, the sensing voltage $V_{a2}$ at the sensing node $a_2$ is increased by the voltage increment $\Delta V$ from the data line voltage $V_{DL}$. That is, $V_{a2}=V_{DL}+\Delta V$. Moreover, the voltage increment $\Delta V$ is determined according to the coupling ratio of the capacitor $C_1$.

At the time point $t_4$, the boost phase BST is ended. Meanwhile, the enable signal EN is activated, and the comparator 410 is enabled. Since the sensing voltage $V_{a2}$ at the sensing node $a_2$ is higher than the comparison voltage $V_{CMP}$, the comparator 410 generates a high-level state output data $D_O$. The high-level output data $D_O$ from the comparator 410 indicates that the selected memory cell is in a low-resistance storage state (e.g., a second storage state).

Similarly, in case that the selected memory cell is in the high-resistance storage state (e.g., the first storage state), the read cycle of the sense amplifier 400 also contains the reset phase RST, the charge phase CHG and the boost phase BST. Please refer to FIG. 5F. In the charge phase CHG, the cell current $I_R$ is very low (e.g., nearly zero). Consequently, the data line voltage $V_{DL}$ and the sensing voltage $V_{a2}$ at the sensing node $a_2$ are very low. Then, in the boost phase BST, because the cell current $I_R$ is too small to charge the voltage $V_{a3}$ at the node $a_3$, the sensing voltage $V_{a2}$ at the sensing node $a_2$ is barely boosted by the coupled voltage $V_{a3}$ at the node $a_3$ and the sensing voltage $V_{a2}$ is maintained at a lower voltage. That is, the sensing voltage $V_{a2}$ at the sensing node $a_2$ is still much lower than the comparison voltage $V_{CMP}$ in the boost phase BST. Consequently, in the end of the boost phase BST (i.e., at the time point $t_4$), the enable signal EN is activated, and the sensing voltage $V_{a2}$ at the sensing node $a_2$ is lower than the comparison voltage $V_{CMP}$. Meanwhile, the comparator 410 generates a low-level state output data $D_O$. The low-level output data $D_O$ from the comparator 410 indicates that the selected memory cell is in a high-resistance storage state (e.g., a first storage state).

In comparison with the data line voltage $V_{DL}$ in FIG. 3E, the sense amplifier 400 of the present invention charges the data line voltage $V_{DL}$ to a relatively low voltage during the charge phase CHE, so that the drain-source voltage $V_{DS}$ of the selecting transistor $M_{SEL}$ is larger and maintains larger cell current $I_R$. In the boost phase BST, the sensing voltage $V_{a2}$ at the sensing node $a_2$ is boosted from the data line voltage $V_{DL}$ to ($V_{DL}+\Delta V$) by the boosting device 421. Consequently, the sense amplifier 400 can correctly judge the storage state of the selected memory cell.

In this embodiment, before the enable signal EN is activated, the comparator 410 is disabled to reduce the power consumption of the comparator 410. When the enable signal EN is activated, the comparator 410 is enabled to generate output data $D_O$. It is noted that numerous modifications and alterations may be made while retaining the teachings of the invention. For example, in another embodiment, when the read action is performed, the comparator 410 is continuously operated. Consequently, the sense amplifier 400 also can generate the correct output data $D_O$. That is, the comparator 410 of the sense amplifier 400 is not equipped with the enable terminal. When the read action of the comparator 410 is continuously operated, the correct output data $D_O$ can be also generated.

Figure 6:
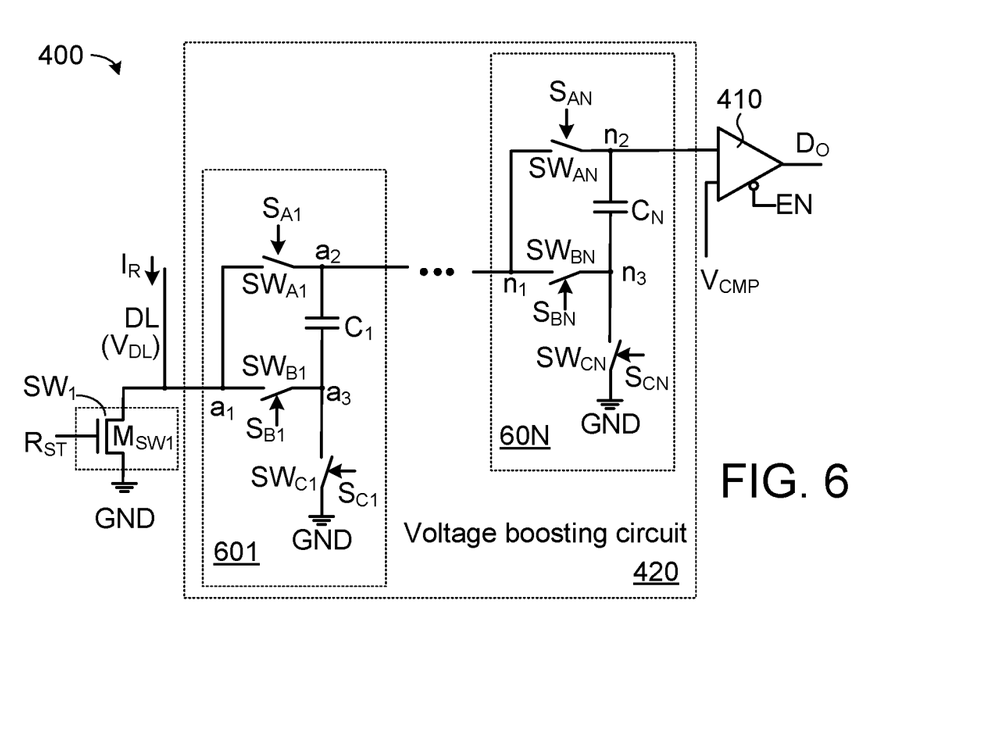
FIG. 6 is a schematic circuit diagram illustrating an example of the sense amplifier according to the second embodiment of the present invention, in which the voltage boosting circuit comprises plural boosting devices.

FIG. 6 is a schematic circuit diagram illustrating an example of the sense amplifier according to the second embodiment of the present invention, in which the voltage boosting circuit comprises plural boosting devices.

In comparison with the sense amplifier of FIG. 5A, the voltage boosting circuit 420 in the sense amplifier 400 of FIG. 6 comprises N boosting devices 601~60N, wherein N is a positive integer larger than 1. The N boosting devices 601~60N are connected between the data line DL and the comparator 410. The circuitry structures of these boosting devices 601~60N are identical. For succinctness, only the connecting relationships between these boosting devices 601~60N will be described as follows.

The input terminal $a_1$ of the first boosting device 601 is connected with the data line DL. The output terminal $n_2$ of the last (i.e., the N-th) boosting device 60N is connected with the comparator 410. Consequently, the node $n_2$ is served as a sensing node. The input terminal of each of the other boosting devices is connected with the output terminal of the previous boosting device, and the output terminal of each of the other boosting device is connected with the input terminal of the next boosting device. Moreover, the capacitance values of the capacitors $C_1 \sim C_N$ of the n boosting devices 601~60N are identical or different. For example, in an implementation example, the capacitor $C_1$ in the first boosting device 610 has the largest capacitance value. Moreover, the capacitance value of the capacitor in each of the other boosting devices is smaller than the capacitance value of the capacitor in the previous boosting device. The rest may be deduced by analogy. In other words, the capacitor $C_N$ of the last boosting device 60N has the smallest capacitance value.

The operations of the plural boosting devices 601~60N shown in FIG. 6 are similar to the operations of the signal boosting device 421 shown in FIG. 5A. For succinctness, only the operations of the sense amplifier with two boosting devices will be described as follows. The operations of the sense amplifier with other number of boosting devices will not be redundantly described herein.

FIGS. 7A, 7B, 7C and 7D schematically illustrate the operations of the sense amplifier according to the second embodiment of the present invention, in which the voltage boosting circuit comprises two boosting devices.

Figure 7A:
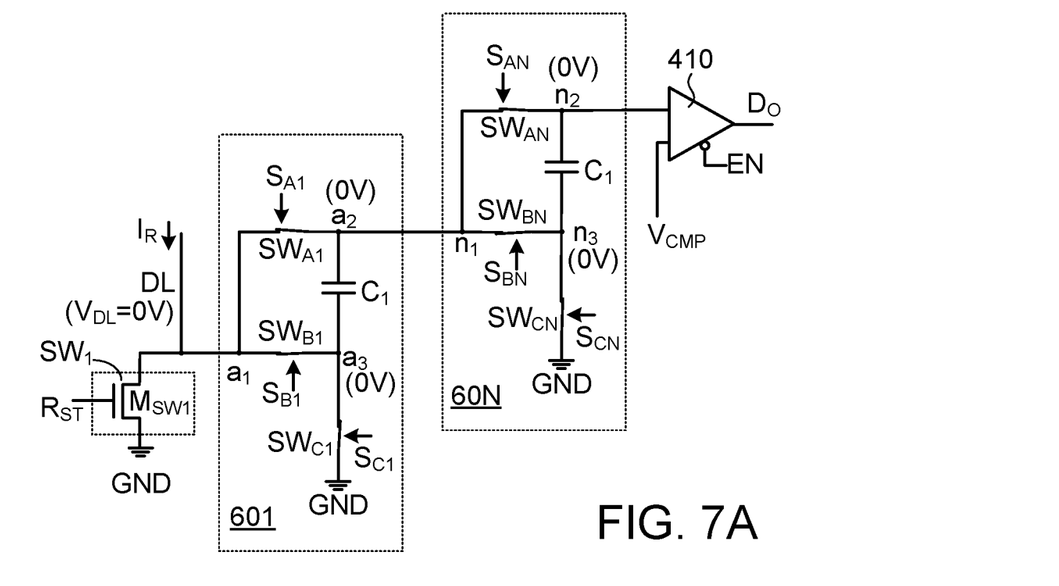
FIGS. 7A, 7B, 7C and 7D schematically illustrate the operations of the sense amplifier according to the second embodiment of the present invention, in which the voltage boosting circuit comprises two boosting devices.

Please refer to FIG. 7A. In the reset phase, all switching devices $SW_1$, $SW_{A1}$, $SW_{B1}$, $SW_{C1}$, $SW_{AN}$, $SW_{BN}$ and $SW_{CN}$ are in the close state. Meanwhile, all of the data line voltage $V_{DL}$, the voltage at the node $a_2$, the voltage at the node $a_3$, the voltage at the node $n_2$ and the voltage at the node $n_3$ are the ground voltage (0V). That is, in the reset phase, the sensing voltage at the sensing node $n_2$ is reset to the ground voltage (0V). After the reset phase RST, the switching device $SW_1$ is in the open state.

Figure 7B:
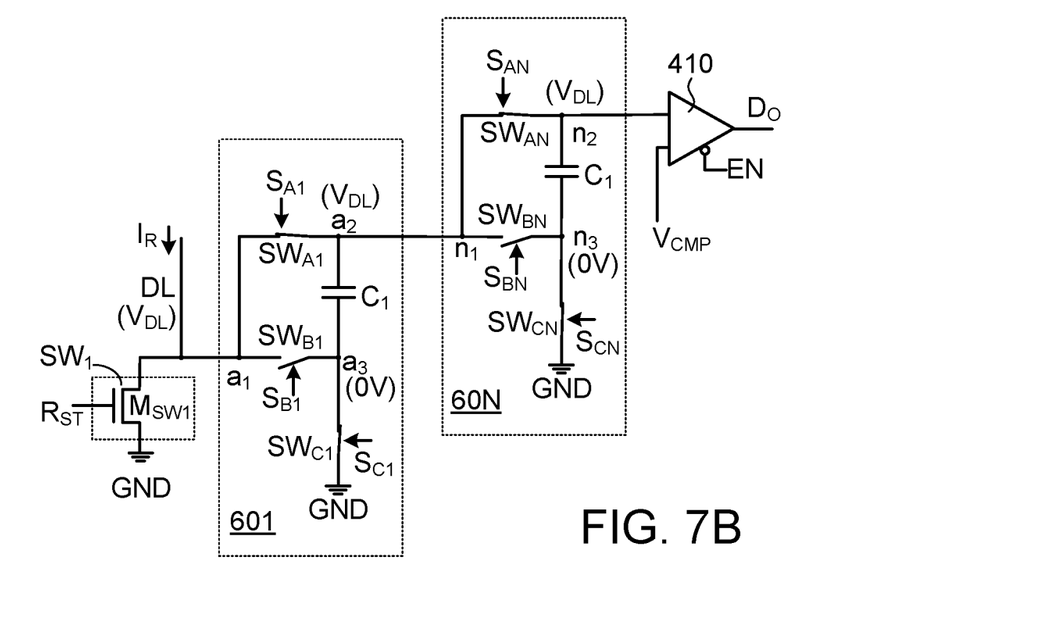

Please refer to FIG. 7B. In the charge phase, the switching devices $SW_{B1}$ and $SW_{BN}$ are in the open state, and the switching devices $SW_{A1}$, $SW_{C1}$, $SW_{AN}$ and $SW_{EN}$ are in the close state. Meanwhile, the cell current $I_R$ charges the data line DL. Consequently, the data line voltage $V_{DL}$ is equal to the voltage at the sensing node $a_2$ and the voltage at the sensing node $n_2$. That is, in the charge phase, the sensing voltage at the sensing node $n_2$ is charged to the data line voltage $V_{DL}$. Moreover, the voltage at the node as and the voltage at the node $n_3$ are the ground voltage (0V).

Figure 7C:
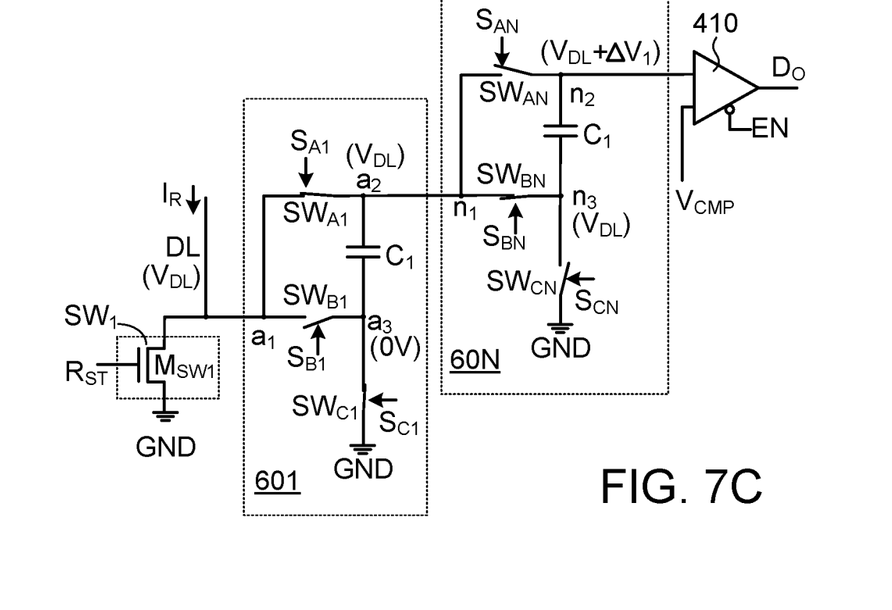

Please refer to FIG. 7C. In the first boost phase, the switching devices $SW_{B1}$, $SW_{AN}$ and $SW_{EN}$ are in the open state, and the switching devices $SW_{A1}$, $SW_{C1}$ and $SW_{BN}$ are in the close state. Meanwhile, the data line voltage $V_{DL}$ is equal to the voltage at the sensing node $a_2$ and the voltage at the sensing node $n_3$. In addition, the sensing voltage at the sensing node $n_2$ is boosted to $(V_{DL}+\Delta V_1)$. That is, in the first boost phase, the sensing voltage at the sensing node $n_2$ is boosted to $(V_{DL}+\Delta V_1)$. Moreover, the voltage at the node as is the ground voltage (0V).

Figure 7D:
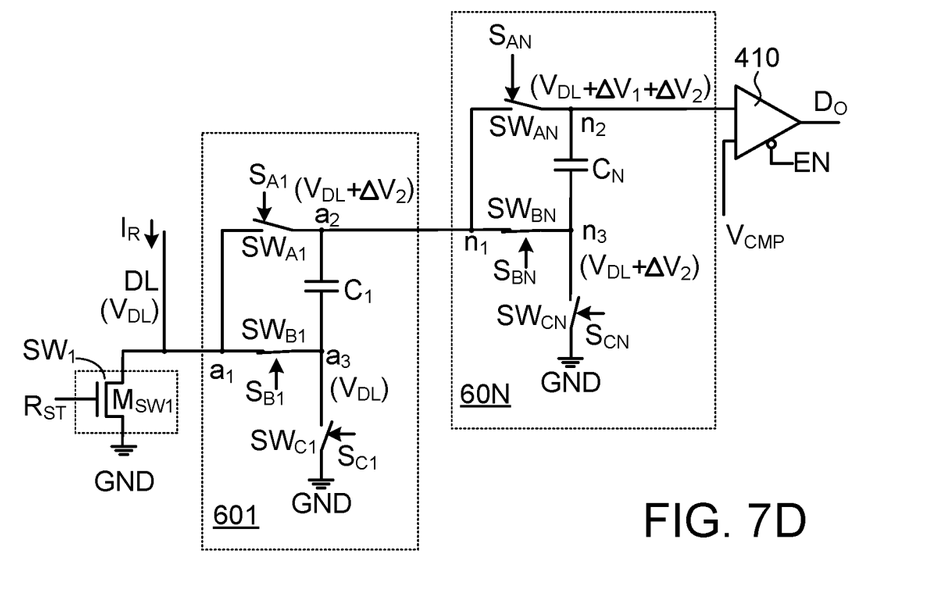

Please refer to FIG. 7D. In the second boost phase, the switching devices $SW_{A1}$, $SW_{C1}$, $SW_{AN}$ and $SW_{EN}$ are in the open state, and the switching devices $SW_{B1}$ and $SW_{BN}$ are in the close state. Meanwhile, the data line voltage $V_{DL}$ is equal to the voltage at the sensing node $a_3$, and each of the voltage at the node $a_2$ and the voltage at the node $n_3$ is boosted to $(V_{DL}+\Delta V_2)$. In addition, the sensing voltage at the sensing node $n_2$ is further boosted to $(V_{DL}+\Delta V_1+\Delta V_2)$. That is, in the second boost phase, the sensing voltage at the sensing node $n_2$ is boosted to $(V_{DL}+\Delta V_1+\Delta V_2)$. Consequently, according to the voltage at the node $n_2$, the comparator 410 determines the storage state of the selected memory cell.

In the second embodiment, the comparison voltage $V_{CMP}$ is a fixed voltage, and the comparison voltage $V_{CMP}$ is supplied by a power supplier (not shown). In some other embodiments, a voltage generator is provided. The voltage generator comprises a reference memory cell. The reference memory cell generates the cell current. The cell current is generated by the reference memory cell. In addition, the comparison voltage $V_{CMP}$ is generated through the cooperation of the reference memory cell and the voltage boosting circuit.

Figure 8:
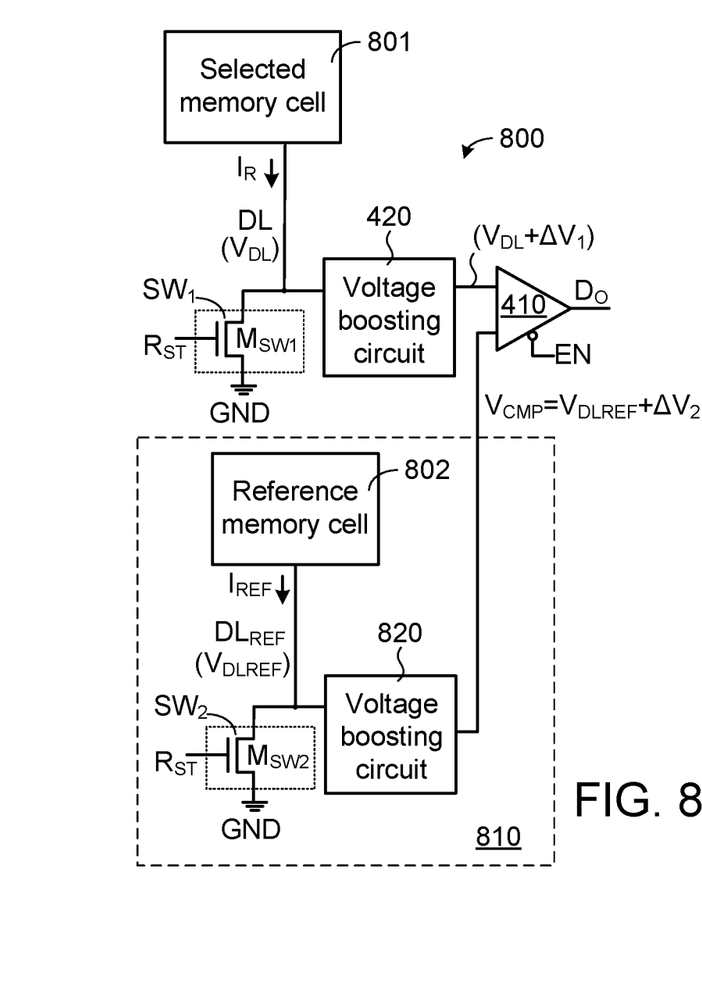
FIG. 8 is a schematic circuit diagram of a sense amplifier according to a third embodiment of the present invention.

FIG. 8 is a schematic circuit diagram of a sense amplifier according to a third embodiment of the present invention. In comparison with the sense amplifier 400 shown in FIG. 4, the sense amplifier 800 in the third embodiment further comprises a voltage generator 810. For brevity, only the circuitry structure of the voltage generator 810 will be described as follows in more details.

In the memory cell array, the magnitude of the cell current generated by the memory cell in the first storage state (e.g., the high-resistance storage state) and the magnitude of the cell current generated by the memory cell in the second storage state (e.g., the low-resistance storage state) are different. For example, the memory cell in the second storage state generates a cell current of 3 µA, and the memory cell in the first storage state generates a cell current of 0 µA. In the third embodiment, a reference memory cell 802 generates a cell current $I_{REF}$ of 1.5 µA. In other words, in the voltage generator 810, the magnitude of the cell current $I_{REF}$ generated by the reference memory cell 802 is in a range between the magnitude of the cell current generated by the memory cell in the first storage state and the magnitude of the cell current generated by the memory cell in the second storage state. Consequently, when the read action is performed, the selected memory cell 801 is coupled to the data line DL, and the reference memory cell 802 is coupled to a reference data line $DL_{REF}$. According to the voltages from the two voltage boosting circuits 420 and 820, the comparator 410 determines the storage state of the selected memory cell 801.

The voltage generator 810 comprises the reference memory cell 802, a switching device $SW_2$ and a voltage boosting circuit 820. The first terminal of the switching device $SW_2$ is connected with the reference data line $DL_{REF}$. The second terminal of the switching device $SW_2$ is connected with the ground terminal GND. The control terminal of the switching device $SW_2$ receives the reset signal $R_{ST}$. The input terminal of the voltage boosting circuit 820 is connected with the reference data line $DL_{REF}$. The output terminal of the voltage boosting circuit 820 generates the comparison voltage $V_{CMP}$ to comparator 410.

In the sense amplifier 800, the two switching devices $SW_1$ and $SW_2$ receive the same reset signal $R_{ST}$. Moreover, the circuitry structures of the two voltage boosting circuits 420 and 820 are identical, and the two voltage boosting circuits 420 and 820 receive the same control signal. For example, in case that the each of two voltage boosting circuits 420 and 820 comprises one boosting device, the three switching devices switching devices $SW_{A1}$, $SW_{B1}$ and $SW_{C1}$ in the voltage boosting device 420 and the corresponding switching devices switching devices $SW_{A1}$, $SW_{B1}$ and $SW_{C1}$ in the voltage boosting device 820 are respectively controlled according to the three control signals $S_{A1}$, $S_{B1}$ and $S_{C1}$ at the same time.

In the reset phase of the read action, the data line DL, the reference data line $DL_{REF}$ and the two input terminals of the comparator 410 are reset to the ground voltage (0V). That is, in the reset phase, the voltage from the output terminal of the voltage boosting circuit 420 is reset to the ground voltage (0V), and the comparison voltage $V_{CMP}$ from the output terminal of the voltage boosting circuit 820 is reset to the ground voltage (0V).

In the charge phase of the read action, the cell current $I_R$ generated by the selected memory cell 801 charges the data line DL, and the reference cell current $I_{REF}$ generated by the reference memory cell 802 charges the reference data line $DL_{REF}$. That is, in the charge phase, the voltage from the output terminal of the voltage boosting circuit 420 is charged to the data line voltage $V_{DL}$, and the comparison voltage $V_{CMP}$ from the output terminal of the voltage boosting circuit 820 is charged to the reference data line voltage $V_{DLREF}$.

In the boost phase of the read action, the voltage from the voltage boosting circuit 420 is the data line voltage $V_{DL}$ plus a first voltage increment $\Delta V_1$ (i.e., $V_{DL}+\Delta V_1$), and the voltage from the voltage boosting circuit 820 is the reference data line voltage $V_{DLREF}$ plus a second voltage increment $\Delta V_2$ (i.e., $V_{DLREF}+\Delta V_2$). That is, in the boost phase, the voltage from the output terminal of the voltage boosting circuit 420 is increased to ($V_{DL}+\Delta V_1$), and the comparison voltage $V_{CMP}$ from the output terminal of the voltage boosting voltage 820 is boosted to ($V_{DLREF}+\Delta V_2$). Consequently, according to the voltages from the two voltage boosting circuits 420 and 820, the comparator 410 determines the storage state of the selected memory cell.

According to the similar operating principles, the sense amplifier 800 of the third embodiment can be further applied to a non-volatile memory with differential memory cells. A single differential memory cell comprises two memory cells. After the program action is completed, the two memory cells are respectively in two complementary storage states. For example, in case that the first memory cell is in the high-resistance storage state and the second memory cell is in the low-resistance storage state, the differential memory cell is in the first storage state. Alternatively, in case that the first memory cell is in the low-resistance storage state and the second memory cell is in the high-resistance storage state, the differential memory cell is in the second storage state. In other words, the differential memory cell is a combination of two memory cells to store a 1-bit data.

Figure 9:
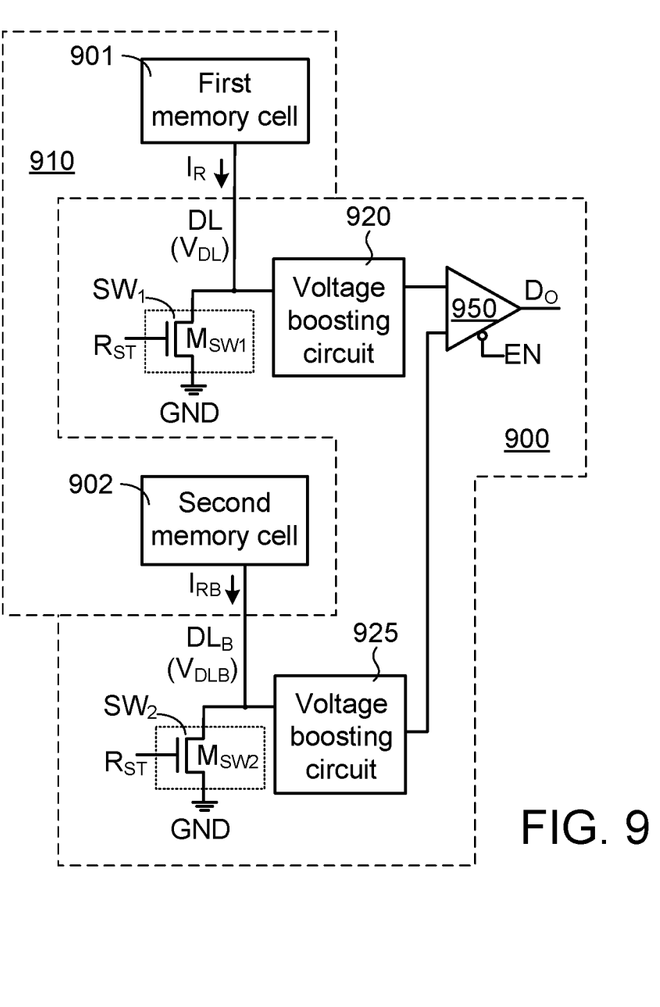
FIG. 9 is a schematic circuit diagram of a sense amplifier according to a fourth embodiment of the present invention.

FIG. 9 is a schematic circuit diagram of a sense amplifier according to a fourth embodiment of the present invention. When the read action is performed, a first memory cell 901 of the selected differential memory cell 910 is coupled to a data line DL, and a second memory cell 902 of the selected differential memory cell 910 is coupled to an inverted data line $DL_B$. In addition, the sense amplifier 900 comprises two switching devices $SW_1$, $SW_2$, two voltage boosting circuits 920, 925 and a comparator 950.

The first terminal of the switching device $SW_1$ is connected with the data line DL. The second terminal of the switching device $SW_1$ is connected with the ground terminal GND. The control terminal of the switching device $SW_1$ receives a reset signal $R_{ST}$. The first terminal of the switching device $SW_2$ is connected with the inverted data line $DL_B$. The second terminal of the switching device $SW_2$ is connected with the ground terminal GND. The control terminal of the switching device $SW_2$ receives the reset signal $R_{ST}$.

The input terminal of the voltage boosting circuit 920 is connected with the data line DL. The output terminal of the voltage boosting circuit 920 is connected with the first input terminal of the comparator 950. The input terminal of the voltage boosting circuit 925 is connected with the inverted data line $DL_B$. The output terminal of the voltage boosting circuit 925 is connected with the second input terminal of the comparator 950. The enable terminal of the comparator 950 receives the enable signal EN. The output terminal of the comparator 950 generates the output data $D_O$.

Similarly, the two switching devices $SW_1$ and $SW_2$ receive the same reset signal $R_{ST}$. Moreover, the circuitry structures of the two voltage boosting circuits 920 and 925 are identical, and the two voltage boosting circuits 920 and 925 receive the same control signal.

The operations of the sense amplifier 900 are similar to the operations of the sense amplifier 800 in the third embodiment. When the read action is performed by the sense amplifier 900, the read cycle of the sense amplifier 900 also contains the reset phase, the charge phase and the boost phase. Then, according to the voltages from the output terminals of the two voltage boosting circuits 920 and 925, the comparator 950 determines the storage state of the selected differential memory cell.

Figure 10:
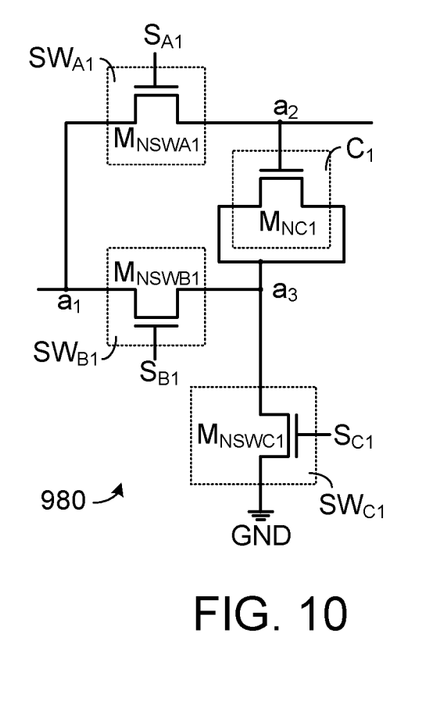
FIG. 10 is a schematic detail circuit diagram illustrating an exemplary boosting device in the sense amplifier of the present invention.

FIG. 10 is a schematic detail circuit diagram illustrating an exemplary boosting device in the sense amplifier of the present invention. Generally, the switching devices $SW_{A1}$, $SW_{B1}$ and $SW_{C1}$ in the boosting device can be implemented with the n-type transistors.

As shown in FIG. 10, the boosting device 980 comprises switching devices $SW_{A1}$, $SW_{B1}$ and $SW_{C1}$, which are respectively implemented with n-type transistors $M_{NSWA1}$, $M_{NSWB1}$ and $M_{NSWC1}$. The first source/drain terminal of the transistor $M_{NSWA1}$ is connected with the node $a_1$. The second source/drain terminal of the transistor $M_{NSWA1}$ is connected with the node $a_2$. The gate terminal of the transistor $M_{NSWA1}$ receives the control signal $S_{A1}$. The first source/drain terminal of the transistor $M_{NSWB1}$ is connected with the node $a_1$. The second source/drain terminal of the transistor $M_{NSWB1}$ is connected with the node $a_3$. The gate terminal of the transistor $M_{NSWB1}$ receives the control signal $S_{B1}$. The first source/drain terminal of the transistor $M_{NSWC1}$ is connected with the node $a_3$. The second source/drain terminal of the transistor $M_{NSWC1}$ is connected with the ground terminal GND. The gate terminal of the transistor $M_{NSWC1}$ receives the control signal $S_{C1}$. In case that the control signals $S_{A1}$, $S_{B1}$, $S_{C1}$ are in the high-level state, the switching devices $SW_{A1}$, $SW_{B1}$ and $SW_{C1}$ are in the close state. In case that the control signals $S_{A1}$, $S_{B1}$, $S_{C1}$ are in the low-level state, the switching devices $SW_{A1}$, $SW_{B1}$ and $SW_{C1}$ are in the open state. Moreover, the capacitor $C_1$ is implemented with the n-type transistor $M_{NC1}$. The gate terminal of the transistor $M_{NC1}$ is connected with the node $a_2$. The first drain/source terminal and the second drain/source terminal of the transistor $M_{NC1}$ are connected with the node $a_3$.

Of course, the connecting relationship between the capacitor $C_1$ and associated components in FIG. 10 may be modified. In a variant example, the first terminal and the second terminal of the transistor $M_{NC1}$ are connected with the node $a_2$, and the gate terminal of the transistor $M_{NC1}$ is connected with the node $a_3$. In addition, the transistor $M_{NC1}$ is an n-type depletion transistor.

From the above descriptions, the present invention provides a sense amplifier for a non-volatile memory. The sense amplifier comprises a voltage boosting circuit. The voltage boosting circuit is connected between the data line and the comparator. The sense amplifier of the present invention charges the data line voltage $V_{DL}$ to a relatively low voltage, so that the selected memory cell generates a larger cell current $I_R$. Consequently, the sensing time of the sense amplifier is largely shortened. In addition, the sense amplifier can determine the storage state of the memory cell correctly.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A sense amplifier for a non-volatile memory, a first memory cell of the non-volatile memory being coupled to a data line, the sense amplifier comprising:
   a first switching device, wherein a first terminal of the first switching device is connected with the data line, a second terminal of the first switching device is connected with a ground terminal, and a control terminal of the first switching device receives a first control signal, wherein the first control signal is a reset signal;
   a first voltage boosting circuit, wherein an input terminal of the first voltage boosting circuit is connected with the data line, and an output terminal of the first voltage boosting circuit is connected with a sensing node; and
   a comparator, wherein a first input terminal of the comparator receives a comparison voltage, a second input terminal of the comparator is connected with the sensing node, and an output terminal of the comparator generates an output data,
   wherein in a reset phase of a read action, a data line voltage on the data line is reset to a ground voltage, and a sensing voltage at the sensing node is reset to the ground voltage,
   wherein in a charge phase of the read action after the reset phase, the first memory cell generates a first cell current to charge the data line, and the sensing voltage is adjusted to the data line voltage under control of the first voltage boosting circuit,
   wherein in a boost phase of the read action after the charge phase, the sensing voltage is adjusted to the data line voltage plus a first voltage increment under control of the first voltage boosting circuit,
   wherein according to the comparison voltage and the sensing voltage, the comparator generates the output data to determine a storage state of the first memory cell.

2. The sense amplifier as claimed in claim 1, wherein the first switching device is a first transistor, wherein a first drain/source terminal of the first transistor is connected with the data line, a second drain/source terminal of the first transistor is connected with the ground terminal, and a gate terminal of the first transistor receives the first control signal.

3. The sense amplifier as claimed in claim 1, wherein the comparator comprises an enable terminal, and the enable terminal receives an enable signal, wherein when the boost phase of the read action is ended, the enable signal is activated, and the comparator generate the output data according to the comparison voltage and the sensing voltage.

4. The sense amplifier as claimed in claim 1, wherein the first voltage boosting circuit comprises a boosting device, wherein an input terminal of the boosting device is connected with a first node, the first node is connected with the data line, an output terminal of the boosting device is connected with the sensing node, and the boosting device comprises:
   a second switching device, wherein a first terminal of the second switching device is connected with the first node, a second terminal of the second switching device is connected with the sensing node, and a control terminal of the second switching device receives a second control signal;
   a third switching device, wherein a first terminal of the third switching device is connected with the first node, a second terminal of the third switching devices is connected with a second node, and a control terminal of the third switching device receives a third control signal;
   a fourth switching device, wherein a first terminal of the fourth switching device is connected with the second node, a second terminal of the fourth switching device is connected with the ground terminal, and a control terminal of the fourth switching device receives a fourth control signal; and
   a first capacitor, wherein a first terminal of the first capacitor is connected with the sensing node, and a second terminal of the first capacitor is connected with the second node.

5. The sense amplifier as claimed in claim 4, wherein in the reset phase of the read action, the first switching device, the second switching device, the third switching device and the fourth switching device are in a close state, and each of the data line voltage and the sensing voltage is reset to the ground voltage, in the charge phase of the read action, the second switching device and the fourth switching device are in the close state, the first switching device and the third switching device are in an open state, and the data line voltage is equal to the sensing voltage, wherein in the boost phase of the read action, the third switching device is in the close state, the first switching device, the second switching device and the fourth switching device are in the open state, and the sensing voltage is equal to the data line voltage plus the first voltage increment.

6. The sense amplifier as claimed in claim 1, wherein the first voltage boosting circuit comprises a boosting device, wherein an input terminal of the boosting device is connected with a first node, the first node is connected with the data line, an output terminal of the boosting device is connected with the sensing node, and the boosting device comprises:
   a second transistor, wherein a first drain/source terminal of the second transistor is connected with the first node, a second drain/source terminal of the second transistor is connected with the sensing node, and a gate terminal of the second transistor receives a second control signal;
   a third transistor, wherein a first drain/source terminal of the third transistor is connected with the first node, a second drain/source terminal of the third transistors is connected with a second node, and a gate terminal of the third transistor receives a third control signal;
   a fourth transistor, wherein a first drain/source terminal of the fourth transistor is connected with the second node, a second drain/source terminal of the fourth transistor is connected with the ground terminal, and a gate terminal of the fourth transistor receives a fourth control signal; and
   a first capacitor, wherein a first terminal of the first capacitor is connected with the sensing node, and a second terminal of the first capacitor is connected with the second node.

7. The sense amplifier as claimed in claim 6, wherein the first capacitor comprises a fifth transistor, wherein a first drain/source terminal and a second drain/source terminal of the fifth transistor are connected with the second node, and a gate terminal of the fifth transistor is connected with the sensing node.

8. The sense amplifier as claimed in claim 7, wherein the fifth transistor is a depletion transistor.

9. The sense amplifier as claimed in claim 1, wherein the first voltage boosting circuit comprises N boosting devices, and N is a positive integer larger than 1, wherein in the N boosting devices, an input terminal of a first boosting device is connected with a first node, an output terminal of an N-th is connected with the sensing node, an input terminal of each of the other boosting devices is connected with an output terminal of a previous boosting device, an output terminal of each of the other boosting devices is connected with an input terminal of a next boosting device, and the first node is connected with the data line.

10. The sense amplifier as claimed in claim 9, wherein the first boosting device comprises:
  a second switching device, wherein a first terminal of the second switching device is connected with the first node, a second terminal of the second switching device is connected with a second node, the second node is the output terminal of the first boosting device, and a control terminal of the second switching device receives a second control signal;
  a third switching device, wherein a first terminal of the third switching device is connected with the first node, a second terminal of the third switching device is connected with a third node, and a control terminal of the third switching device receives a third control signal;
  a fourth switching device, wherein a first terminal of the fourth switching device is connected with the third node, a second terminal of the third switching device is connected with the ground terminal, and a control terminal of the fourth switching device receives a fourth control signal; and
  a first capacitor, wherein a first terminal of the first capacitor is connected with the second node, and a second terminal of the first capacitor is connected with the third node.

11. The sense amplifier as claimed in claim 9, wherein the first boosting device comprises:
  a second transistor, wherein a first drain/source terminal of the second transistor is connected with the first node, a second drain/source terminal of the second transistor is connected with a second node, the second node is the output terminal of the first boosting device, and a gate terminal of the second transistor receives a second control signal;
  a third transistor, wherein a first drain/source terminal of the third transistor is connected with the first node, a second drain/source terminal of the third transistor is connected with a third node, and a gate terminal of the third transistor receives a third control signal;
  a fourth transistor, wherein a first drain/source terminal of the fourth transistor is connected with the third node, a second drain/source terminal of the third transistor is connected with the ground terminal, and a gate terminal of the fourth transistor receives a fourth control signal; and
  a first capacitor, wherein a first terminal of the first capacitor is connected with the second node, and a second terminal of the first capacitor is connected with the third node.

12. The sense amplifier as claimed in claim 11, wherein the first capacitor comprises a fifth transistor, wherein a first drain/source terminal and a second drain/source terminal of the fifth transistor are connected with the third node, and a gate terminal of the fifth transistor is connected with the second node.

13. The sense amplifier as claimed in claim 12, wherein the fifth transistor is a depletion transistor.

14. The sense amplifier as claimed in claim 1, further comprising:
  a reference memory cell coupled to a reference data line;
  a second switching device, wherein a first terminal of the second switching device is connected with the reference data line, a second terminal of the second switching device is connected with the ground terminal, and a control terminal of the second switching device receives the reset signal; and
  a second voltage boosting circuit, wherein an input terminal of the second voltage boosting circuit is connected with the reference data line, and an output terminal of the second voltage boosting circuit is connected with the first input terminal of the comparator, and the output terminal of the second voltage boosting is capable of generating the comparison voltage,
  wherein if the first memory cell is in a first storage state, the first memory cell generates a first cell current to the data line when the read action is performed, wherein if the first memory cell is in a second storage state, the first memory cell generates a second cell current to the data line when the read action is performed, wherein a magnitude of a reference cell current generated by the reference memory cell is in a range between the first cell current and the second cell current,
  wherein in the reset phase of the read action, a reference data line voltage on the reference data line is reset to the ground voltage, and the comparison voltage is reset to the ground voltage,
  wherein in the charge phase of the read action, the reference memory cell generates the reference cell current to charge the reference data line, and the comparison voltage is adjusted to the reference data line voltage under control of the second voltage boosting circuit,
  wherein in the boost phase of the read action, the comparison voltage is adjusted to the reference data line voltage plus a second voltage increment under control of the second voltage boosting circuit.

15. The sense amplifier as claimed in claim 1, further comprising:
  a second memory cell coupled to an inverted data line, wherein the first memory cell and the second memory cell are collaboratively formed as a differential memory cell;
  a second switching device, wherein a first terminal of the second switching device is connected with the inverted data line, a second terminal of the second switching device is connected with the ground terminal, and a control terminal of the second switching device receives the reset signal; and
  a second voltage boosting circuit, wherein an input terminal of the second voltage boosting circuit is connected with the inverted data line, and an output terminal of the second voltage boosting circuit is connected with the first input terminal of the comparator, and the output terminal of the second voltage boosting is capable of generating the comparison voltage,
  wherein in the reset phase of the read action, an inverted data line voltage on the inverted data line is reset to the ground voltage, and the comparison voltage is reset to the ground voltage,
  wherein in the charge phase of the read action, the second memory cell generates a second cell current to charge the inverted data line, and the comparison voltage is adjusted to the inverted data line voltage under control of the second voltage boosting circuit, wherein in the boost phase of the read action, the comparison voltage is adjusted to the inverted data line voltage plus a second voltage increment under control of the second voltage boosting circuit.

* * * * *